United States Patent [19]

Frenette

[11] Patent Number: 4,934,091
[45] Date of Patent: Jun. 19, 1990

[54] ICE FISHING DEVICE WITH AUTOMATIC ALARM

[76] Inventor: Murray M. Frenette, Tr 32-155 Colonization Avenue, Dryden, Canada

[21] Appl. No.: 344,908

[22] Filed: Apr. 28, 1989

[51] Int. Cl.⁵ ............................................. A01K 97/12
[52] U.S. Cl. ........................................................ 43/17
[58] Field of Search ....................................... 43/16, 17

[56] References Cited

U.S. PATENT DOCUMENTS

| | | | |
|---|---|---|---|
| 449,203 | 3/1891 | Bushong | 43/17 |
| 1,391,002 | 9/1921 | Morin | 43/17 |
| 2,973,599 | 3/1961 | Olson | 43/17 |
| 4,030,223 | 6/1977 | Loesch | 43/17 |

Primary Examiner—Kurt Rowan
Attorney, Agent, or Firm—Adrian D. Battison; Stanley G. Ade; Murray E. Thrift

[57] ABSTRACT

A fishing device comprises a rod formed in two rod portions connectable at a center position by a coil spring attached to both of the rod portions. The coil spring is wrapped around the upper portion and is releasably attached to a cap on the lower portion which is of a larger diameter. A battery, speaker and fishing line are mounted on the lower portion. A hook is mounted on the upper portion at a position spaced from the upper end. A simple spring steel arm is fastened to one side of the lower portion and projects out beyound the end of the lower portion to position alongside the coil spring. With the fishing line attached to the hook on the upper portion, when the fishing line is pulled it distorts the upper portion and thus bends the spring into contact with the spring arm and this causes the completion of a circuit connecting the battery to the speaker. A spike at the lower end of the lower portion can be inserted into the ice adjacent an ice fishing hole. The spacing of the hook on the upper portion from its end enables the end to contact the ice on the side of the hole opposite the spike so that the unit cannot be pulled through the hole and lost.

15 Claims, 2 Drawing Sheets

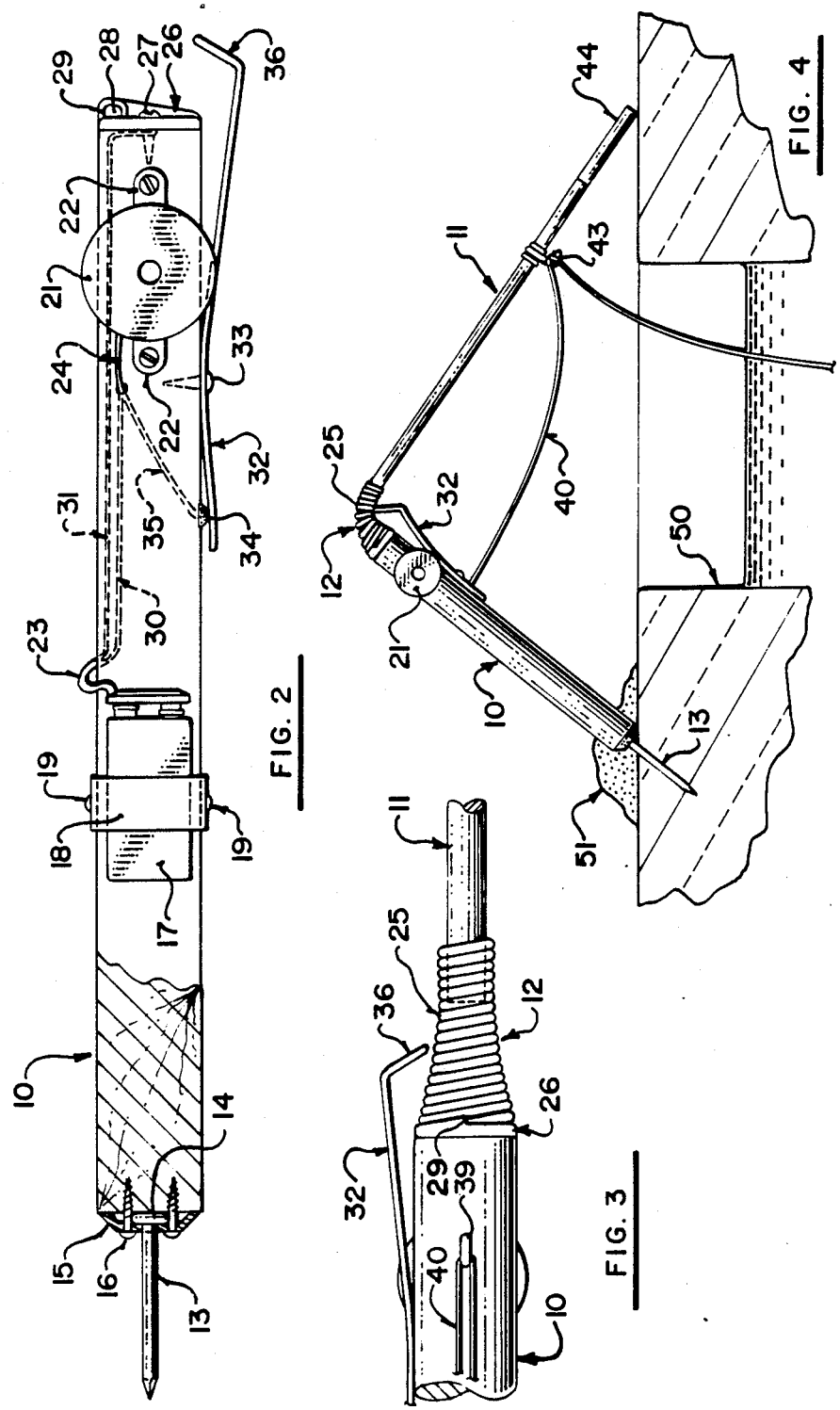

ICE FISHING DEVICE WITH AUTOMATIC ALARM

BACKGROUND OF THE INVENTION

This invention relates to an ice fishing device in the form of rod and line with an alarm actuable by a fish pulling on the line so that the fisherman can leave the rod to some extent unattended and can return on actuation of the alarm.

U.S. Pat. No. 4,458,438 (McCulley) discloses a fish strike indicator in which a fishing rod is formed in two rod portions one of which can be inserted into a ferrule on the other. There is a speaker provided on the lower portion and a battery supply providing electrical voltage for powering the speaker. The speaker is actuated by a wire device connected to a tip end of the upper portion of the rod which actuates a connection between contacts mounted at the junction between the two rod portions. This device is however of a very complicated nature making it expensive to manufacture leading to an unacceptable retail price. The device is in addition of a complex nature which makes it delicate and prone to breakdown when used in rugged conditions prevalent in ice fishing. Furthermore there is significant danger that a fish pulling vigorously on the line can pull the whole device into the water so it is then lost unless the device is fixedly mounted on the ground or on the ice surface. When ice fishing it is very difficult if not impossible to mount the device so that it is absolutely fixed since the ice surface is not conducive to providing sufficient fixing force. There is always a danger therefore the device can be pulled away from the ice and lost through the hole in the ice unless it is designed to prevent this possible loss.

U.S. Pat. No. 449,202 (Bushong) discloses a very primitive arrangement in which there is provided a rod formed from two separate rod portions connected by a coil spring, a line attached to the upper one of the portions and a bell carried by the upper one of the portions so the fish pulling on the line will cause a vibration in the upper rod portion which will presumably ring the bell. This device is of course very primitive and relies upon a relatively vigorous pulling action by the fish to cause the bell to ring. This pulling action can only occur when the fish is properly hooked and that is well known in many cases is necessary to hook the fish by pulling the line vigorously while the fish is only nibbling around the bait. It is important therefore for an indicator not only to indicate when a fish is actually hooked on the line but also to indicate when the fish is nibbling on the bait or has removed the bait since the fisherman will, even if he has not caught a fish, wish to replace the bait to ensure that further fish are lured.

U.S. Pat. No. 2,578,887 (Jackson) discloses an automatic fishing device in which a rod is formed in two separate rod portions coupled by a coil spring together with a trap actuated by pulling of the line. In use the rod is bent into a trap position and then released from the trap position when the line is pulled so the rod straightens to a retracted position to catch the fish. Devices of this type are well known but have achieved little success. The problem remains in the Jackson device that unless the device is very firmly attached to the ground, the fish can pull the whole device into the water through the hole. The relatively large heavy plate provided in Jackson to mount the device on the ground is highly undesirable for ice fishing where transportation of bulky equipment is very difficult and undesirable.

Other devices used in fishing are shown in U.S. Pat. Nos. 4,727,673 (Dumar), 3,470,647 (Horner), 3,739,514 (Odney), 2,733,532 (Siegel), 2,922,243 (Weaver), 4,571,876 (LeClair) and 3,729,849 (Richard) and in Canadian Patent Nos. 461,805 (Davis) and 511,235 (Backe). These devices show various indicators for providing indication to the fisherman that the fish has or is taking the bait. The devices are generally complex and unsatisfactory leading to little commercial success.

SUMMARY OF THE INVENTION

It is one object of the present invention to provide an improved fishing device which is simple, economic to manufacture and rugged in construction enabling it to be sold at a relatively low price.

It is a further object of the present invention to provide a fishing device which is designed to prevent the device from being pulled from a position of mounting on an ice surface surrounding the hole through the hole.

It is a further object of the present invention to provide a device which provides an alarm on taking of the bait by the fish with the alarm being simple and economic to construct and very rugged so that it is difficult to damage in the harsh environment of ice fishing.

According to the present invention there is provided a fishing device comprising a rod having two rod portions, means for connecting the rod portions in end to end relationship, said connecting means including spring biasing means to retain the rod portions aligned and providing flexibility of one portion relative to the other such that an upper one of the portions can pivot relative to the lower portion against the spring bias providing by the spring biasing means about an axis transverse to the portions, means on an end of the lower portion remote from the upper portion for mounting the lower portion in a fixed position on the ground, means mounting a fishing line on one of the portions, fastener means for fastening the line to the upper portion at a position on the upper portion adjacent to but spaced from an end thereof remote from the lower portion, an alarm means for providing an alarm on detection of a pivoting movement of said upper portion relative to said lower portion, said alarm means comprising a sound producing speaker, means for providing an electrical voltage, circuit means for connecting said voltage to said speaker and contact means responsive to said pivoting movement for completing said circuit to actuate said speaker.

According to a second aspect of the invention there is provided a fishing device comprising a rod having two rod portions, means for connecting the rod portions in end to end relationship, said connecting means including spring biasing means to retain the rod portions aligned and providing flexibility of one portion relative to the other such that an upper one of the portions can pivot relative the lower portion against a spring bias providing by the spring biasing means about an axis transverse to the portions, means on an end of the lower portion remote from the upper portion for mounting the lower portion in a fixed position on the ground, means mounting a fishing line on one of the portions, fastener means for fastening the line to the upper portion, an alarm means for providing an alarm on detection of a pivoting movement of said upper portion relative to said lower portion, said alarm means comprising a sound producing speaker, means for providing an electrical voltage, circuit means for connecting said voltage to said speaker and contact means responsive to said pivoting movement for completing said circuit to actuate said speaker, said contact means comprising an arm mounted on one of the portions and extending therefrom to a position beyond the end of said one of the portions, the arm having a contact on an end thereof remote from said one portion for providing electrical connection with a portion of the circuit on the other of said rod portions when the other of said rod portions is pivoted.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a view along the lines 22 of FIG. 1 on an enlarged scale and join part of the lower portion of the rod in cross-section.

FIG. 3 is a view along the lines 33 of FIG. 1 again on an enlarged scale.

FIG. 4 is a side elevational view of the device of FIG. 1 in operation.

In the drawings like characters of reference indicate corresponding parts in the different figures.

DETAILED DESCRIPTION

Figure 1:
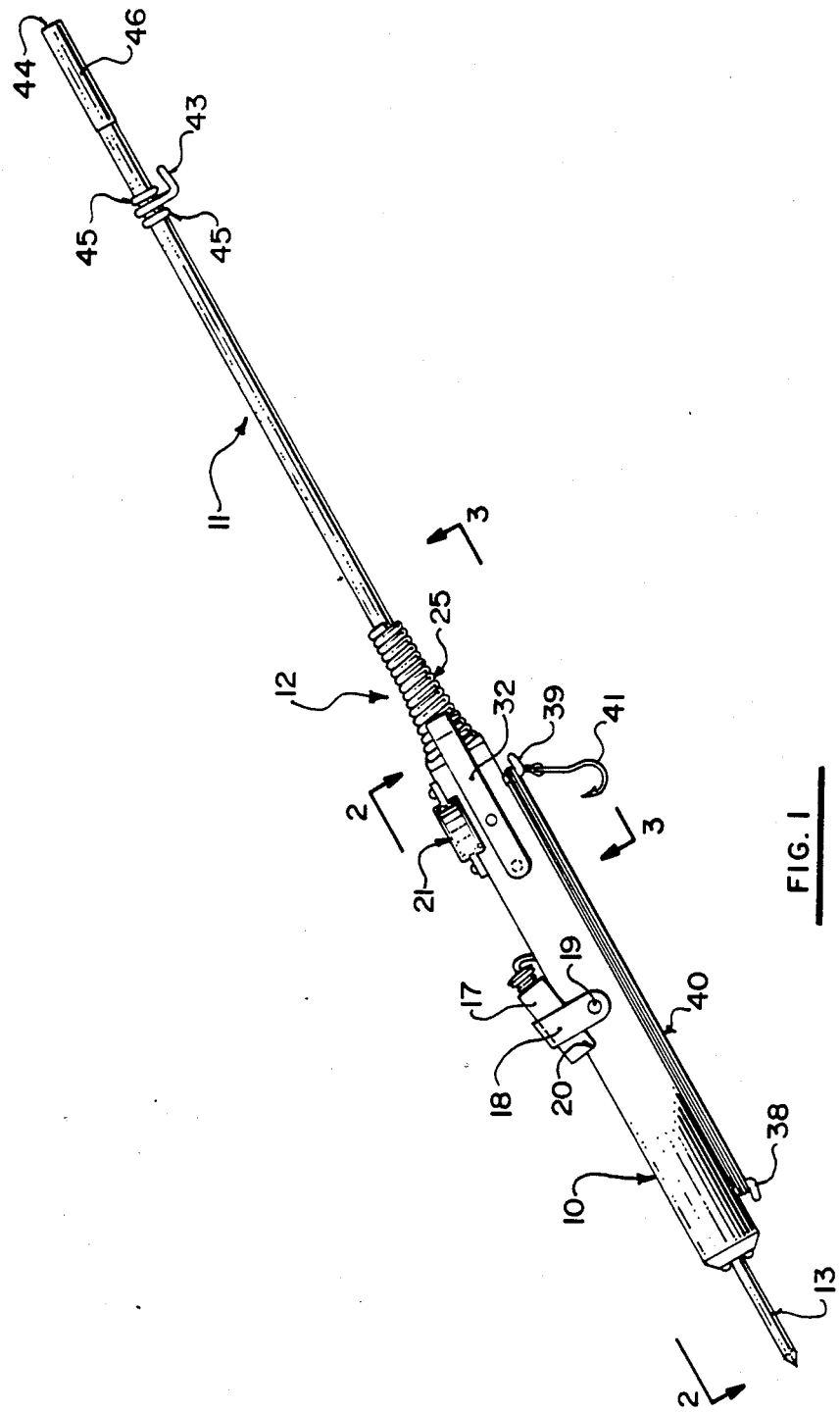
FIG. 1 is an elevational view of a fishing device according to the invention.

The fishing device of FIG. 1 comprises a fishing rod having two rod portions indicated respectively at 10 and 11. The rod portions are joined at a central coupling member 12 at which point they can be separated into two separate parts for ease of transportation and storage. The rod portions are each formed from a dowel rod which is formed of for example solid wood and thus is substantially rigid along its length. Each of the portions is circular in cross-section defining a cylindrical body. The diameter of the lower portion is larger than the upper portion. In one example the lower portion is 1" in diameter and the upper portion is ⅜" in diameter.

The lower portion carries at a lower end thereof remote from the coupling 12 a spike 13. As best shown in FIG. 2, the spike 13 includes a head 14 which is clamped onto the end of the lower portion by a cap 15 screwed to the end face of the lower portion by screws 16. The spike 13 thus projects axially outwardly from the end of the lower portion.

A battery 17 is attached to one side of the lower portion by a strap 18 which wraps around the battery and is attached to the sides of the lower portion by screws 19 thus clamping the battery in place. A notch 20 is formed in one side of the lower portion adjacent the strap to hold the battery simply in place in a manner which prevents it from sliding through the U-shaped strap 18.

A speaker 21 of a type which generates a simple high pitched tone is clamped onto the upper portion on the same side as the battery 17 but spaced towards the upper end of the lower portion. The speaker comprises a commercially available item which has a pair of ears 22 by which it can be screwed onto the side surface of the lower portion with a recess being formed in the side surface to more readily accommodate the flat rear surface on the speaker and to maintain it properly in position. Wiring for the battery is indicated at 23 which communicates from the battery into a channel formed along the surface of the lower portion and drilled into the lower portion to provide the couplings as described hereinafter. The external wiring for the speakers indicated at 24.

The coupling 12 comprises a coil spring 25 formed into a helical shape which tapers from a diameter approximately equal to the diameter of the lower portion to a diameter approximately equal to the diameter of the upper portion. The coil spring is wrapped around a lower end of the upper portion with its diameter being arranged so that it clamps to the upper portion by the spring effect. The lower end of the coil spring 25 is attached to the upper end of the lower portion by way of a cap 26. The cap 26 is clamped to the upper end of the lower portion by a screw 27. The cap 26 defines a helical channel 28 with an opening 29 into which one end of the coil spring can be inserted. The coil spring and upper portion are then rotated so that one turn of the coil spring enters into the helical channel and is firmly held thereby thus clamping the lower end of the spring to the upper end of the lower portion.

The wiring from the battery 17 to the speaker 21 is best shown in FIG. 2. One of the leads from the battery is connected to the speaker directly as indicated at 30. The other of the leads from the battery is connected to the screw 27 and indicated at 31. An arm 32 is mounted on the side surface of the lower portion by a screw 33. The arm 32 contacts a stud 34 connected by a wire 35 to the speaker. Thus when current is communicated from the cap 26 to the arm 32, the speaker is powered to generate a warning or alarm tone.

The arm 32 is formed from spring steel and is clamped onto the side of the lower portion by the single screw 33 so that it can be flexed inwardly and outwardly away from the side of the lower portion. In addition the arm can be rotated about the single screw 33 to move the arm away from the coil spring 25 and away from the stud 34. In addition the spring arm can be plastically deformed. It has an end 36 which is turned inwardly so as to terminate at a position closely adjacent the side edge of the coil spring 35, as best shown in FIG. 3. The position of the tip of the arm can be adjusted by plastically deforming the arm by bending it past its elastic limit. This adjustment can be done manually but to position that the tip of the arm is closely adjacent the side of the spring coil 25 but is free from contact with the spring coil while it remains in a rest state with the upper portion aligned directly with the lower portion.

A pair of hooks 38 and 39 are attached to the side surface of the lower portion which is opposite to the battery 17 and speaker 21. The pair of hooks is arranged with each of the hooks at a respective end of the lower portion so that the hooks can have wrapped therearound a plurality of loops of a fishing line 40. The fishing line carries a hook 41 which can be conveniently looped around one of the hooks to be maintained in position. The spacing between the hooks 38 and 39 can be 12" so that the user will know that a certain length of fishing line has been obtained simply by unwrapping from the hooks a certain number of the loops.

The upper portion 11 includes a hook 43 at a position adjacent to the upper end 44 but spaced from the end 44 by a distance of the order of 6". The hook 43 is rotatable around the upper portion and is confined against axial movement by a pair of collars 45. The uppermost end portion of the upper portion as indicated at 46 can be colored by a highly visible marking such as an orange paint which enables the device to be viewed from a distance. In addition a flag can be attached at this position to render the device even more visible.

In operation, the spike 13 is inserted into the ice at a position to one side of a hole 50 in the ice through which fishing is intended to be carried out. The attachment of the lower portion by the spike 13 can be supplemented by applying a mound or pile of snow or ice 51 around the base of the lower portion so that it is held in position. However the cooperation between the ice and the lower portion is limited in view of the brittleness of the ice.

With the lower portion so mounted, a suitable length of the fishing line 40 is withdrawn from the hooks 38 and 39 and the line is tied to the hook 43 with a suitable knot that prevents it from sliding over the hook 43. The line is then baited and the line, conventional sinker (not shown) and the hook 41 are thrown into the water. In this condition the upper and lower portions remain directly aligned apart from any slight movement which might occur due to the weight of the sinker or any wind movement.

The arm 32 is adjusted so that it lies as close to the coil spring 25 as possible without wind movement or other normal event from causing contact between the coil spring and the arm 32. It is much preferred that this adjustment is carried out so that the absolute minimum amount of movement is necessary to distort the coil spring sufficiently to one side to contact the arm. The arm is then positioned so that it is on the underside of the coil spring in the position shown in FIG. 4.

When the line is pulled by a fish for example by taking the bait and hook or merely by nibbling at the bait, the line is pulled sufficiently to bend the upper portion downwardly through a very shallow angle until the coil spring contacts the arm 32. In this position the circuit previously described is completed and the speaker 21 is powered to generate the alarm tone.

Further violent pulling by a fish on the line will cause the upper portion to bend downwardly to take up a position shown in FIG. 4. In this position the end 44 of the upper portion is arranged to engage the ice surface on the opposite side of the hole from the spike 13. The positioning of the hook 43 at a position spaced from the end 44 ensures that the end 44 engages the ice while the line passes into the hole. In this way the unit is prevented from being pulled out of its connection with the ice by way of the spike 13 through the hole by the fish and thus lost.

If it is desired to jig the rod, the arm 32 can be moved to one side so that it is spaced from the stud and from the coil spring thus enabling the coil spring deflect without causing the alarm tone. The device therefore provides a speaker or beeper which can provide up to 98 decibels for alerting the fisherman of the biting of his hook. The fisherman does not need to watch the device at all times since the tone is always audible.

With the device properly adjusted, the unit is positioned on the ground in an orientation so that the speaker is pointed in a direction in which the fisherman is likely to be, for example at a separate fireplace, and is preferably pointed into the wind so that wind actuated movement of the upper portion does not cause false alarms.

When a large fish is caught and the unit heavily distorted in the position shown in FIG. 4, it may be necessary to re-adjust the arm 32 to provide the best sensitivity.

The device therefore is of a simple and rugged construction and provides an alarm which requires very few operating parts and at the same time is constructed to prevent the loss of the device by its being pulled from the ice mounting into the hole.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fishing device comprising a rod having two rod portions, means for connecting the rod portions in end to end relationship, said connecting means comprising a coil spring having respective ends thereof fastened to respective ones of the two rod portions to retain the rod portions aligned and providing flexibility of one portion relative to the other such that an upper one of the ports can pivot relative to the lower portion against a spring bias provided by the coil spring about an axis transverse to the portions, means on an end of the lower portion remote from the upper portion for mounting the lower portion in a fixed position on the ground, means mounting a fishing line on one of the portions, fastener means for fastening the line to the upper portion at a position on the upper portion adjacent to but spaced from an end thereof remote from the lower portion, an alarm means for providing an alarm on detection of a pivoting movement of said upper portion relative to said lower portion, said alarm means comprising a sound producing speaker, means for providing an electrical voltage, circuit means for connecting said voltage to said speaker and contact means responsive to said pivoting movement for completing said circuit to actuate said speaker wherein the upper and lower portions both comprise a substantially cylindrical rigid rod of circular cross-section, the lower portion having a larger diameter than the upper portion, the coil spring being tapered such that one end of the spring is wrapped around one end of the upper portion and clamps the upper portion so that it is fixed relative to said one end of the spring and wherein the other end of the spring is of a diameter substantially equal to that of the diameter of the lower portion and is attached to an end of the lower portion.

2. A fishing device comprising a rod having two rod portions, means for connecting the rod portions in end to end relationship, said connecting means comprising a coil spring having respective ends thereof fastened to respective ones of the two rod portions to retain the rod portions aligned and providing flexibility of one portion relative to the other such that an upper one of the portions can pivot relative to the lower portion against a spring bias provided by the coil spring about an axis transverse to the portions, means on an end of the lower portion remote from the upper portion for mounting the lower portion in a fixed position on the ground, means mounting a fishing line on one of the portions, fastener means for fastening the line to the upper portion at a position on the upper portion adjacent to but spaced from an end thereof remote from the lower portion, an alarm means for providing an alarm on detection of a pivoting movement of said upper portion relative to said lower portion, said alarm means comprising a sound producing speaker, means for providing an electrical voltage, circuit means for connecting said voltage to said speaker and contact means responsive to said pivoting movement for completing said circuit to actuate said speaker said connecting means including means defining a helical channel on one end of one of the portions such that an end portion of the coil spring can be inserted into the helical channel by rotation of the coil spring and the other of the portions relative to said one portion.

3. The invention according to claim 1 wherein the lower portion includes a pair of hook members projecting outwardly from sides thereof and wherein the line is wrapped around the hook members in a storage position thereof.

4. The invention according to claim 1 wherein the speaker and the voltage means are mounted on the lower portion.

5. The invention according to claim 1 wherein the fastener means on the upper portion comprises a hook and means mounting the hook on the rod portion for rotation around an axis longitudinal of the rod portion.

6. The invention according to claim 1 wherein the contact means comprises an arm mounted on one of the portions and extending therefrom to a position beyond the end of said one of the portions, the arm having a contact on an end thereof remote from said one portion for providing electrical connection with a portion of the circuit on the other of said rod portions when the other of said rod portions is pivoted.

7. The invention according to claim 9 wherein the arm contacts said connecting means.

8. The invention according to claim 7 wherein said voltage means is connected to said coil spring by said circuit means such that engagement of said coil spring with said arm completes the circuit for actuation of said speaker.

9. The invention according to claim 6 wherein the arm is pivotally mounted on said one portion for movement about an axis at right angles to said rod portion so that the arm can be moved to one side of the rod portion to a position in which it can no longer contact said coupling means.

10. The invention according to claim 6 wherein the arm is formed from spring steel such that it can be plastically deformed to adjust the spacing of the end thereof from said other rod portion.

11. A fishing device comprising a rod having two rod portions, means for connecting the rod portions in end to end relationship, said connecting means including spring biasing means to retain the rod portions aligned and providing flexibility of one portion relative to the other such that an upper one of the portions can pivot relative to the lower portion against a spring bias provided by the spring biasing means about an axis transverse to the portions, means on an end of the lower portion remote from the upper portion for mounting the lower portion in a fixed position on the ground, means mounting a fishing line on one of the portions, fastener means for fastening the line to the upper portion, an alarm means for providing an alarm on detection of a pivoting movement of said upper portion relative to said lower portion, said alarm means comprising a sound producing speaker, means for providing an electrical voltage, circuit means for connecting said voltage to said speaker and contact means responsive to said pivoting movement for completing said circuit to actuate said speaker, said contact means comprising an arm mounted on one of the portions and extending therefrom to a position beyond the end of said one of the portions, the arm having a contact on an end thereof remote from said one portion for providing electrical connection with a portion of the circuit on the other of said rod portions when the other of said rod portions is pivoted.

12. The invention according to claim 11 wherein the arm contacts said connecting means.

13. The invention according to claim 12 wherein the connecting means comprises a coil spring having one end attached to said upper portion and an opposed end attached to said lower portion, said voltage means being connected to said coil spring by said circuit means such that engagement of said coil spring with said arm completes the circuit for actuation of said speaker.

14. The invention according to claim 11 wherein the arm is pivotally mounted on said one portion for movement about an axis at right angles to said rod portion so that the arm can be moved to one side of the rod portion to a position in which it can no longer contact said coupling means.

15. The invention according to claim 11 wherein the arm is formed from spring steel such that it can be plastically deformed to adjust the spacing of the end thereof from said other rod portion.

* * * * *